(12) United States Patent
Goossen

(10) Patent No.: US 7,025,018 B2
(45) Date of Patent: Apr. 11, 2006

(54) SUBMERGIBLE TERRARIUM

(75) Inventor: Theodorus Jozef Goossen, St. Catharines (CA)

(73) Assignee: Aquadomehome Ontario Ltd., St. Catharines ( * ) Notice: Subject to any disclaimer, the term of this patent is extended or adjusted under 35 U.S.C. 154(b) by 14 days.

(21) Appl. No.: 10/664,949

(22) Filed: Sep. 22, 2003

(65) Prior Publication Data

US 2005/0072369 A1   Apr. 7, 2005

(51) Int. Cl.
*A01K 63/00* (2006.01)

(52) U.S. Cl. ...................... 119/246; 119/256
(58) Field of Classification Search ............ 119/246, 119/247, 248, 251, 254, 256, 61.53; D30/105
See application file for complete search history.

(56) References Cited

U.S. PATENT DOCUMENTS

| | | | | |
|---|---|---|---|---|
| 715,571 | A | * | 12/1902 | Gillinder .................. 119/256 |
| 2,844,912 | A | * | 7/1958 | Sebesta .................... 119/254 |
| 3,057,094 | A | * | 10/1962 | Winkelman ............... 119/254 |
| 3,939,607 | A | | 2/1976 | Spector |
| 4,204,499 | A | * | 5/1980 | Leyva et al. .............. 119/246 |
| 4,958,593 | A | | 9/1990 | Hulburt et al. |
| 5,000,118 | A | * | 3/1991 | Merritt et al. ............ 119/246 |
| 5,253,609 | A | * | 10/1993 | Partelow et al. ......... 119/61.53 |
| 5,313,912 | A | | 5/1994 | O'Dell |
| 5,337,701 | A | * | 8/1994 | Syers ...................... 119/251 |
| 5,467,738 | A | * | 11/1995 | Cass ....................... 119/61.53 |
| 5,476,068 | A | * | 12/1995 | Townsend ................. 119/256 |
| 5,957,085 | A | * | 9/1999 | Youngstrom et al. ...... 119/246 |
| 6,029,605 | A | | 2/2000 | Licata |
| 6,176,202 | B1 | | 1/2001 | Wood |
| 6,283,061 | B1 | | 9/2001 | Dunn |
| 6,363,889 | B1 | * | 4/2002 | Lamendola ................ 119/246 |

* cited by examiner

*Primary Examiner*—Teri Pham Luu
*Assistant Examiner*—Elizabeth Shaw
(74) *Attorney, Agent, or Firm*—Eugene J. A. Gierczak

(57) ABSTRACT

A terrarium adapted to be immersed in an aquarium containing water, the terrarium comprising a shaft means having a first end and second end and a receptacle defining at least one wall, the at least one wall having a length, presenting at least one opening, an air exhaust and an interior wherein the receptacle is connected to the shaft means at the first end wherein the shaft means at the second end is adapted to anchor the receptacle in the aquarium and wherein the interior of the receptacle is adapted to receive air from an air supply means so as to define a dry zone in the interior.

12 Claims, 9 Drawing Sheets

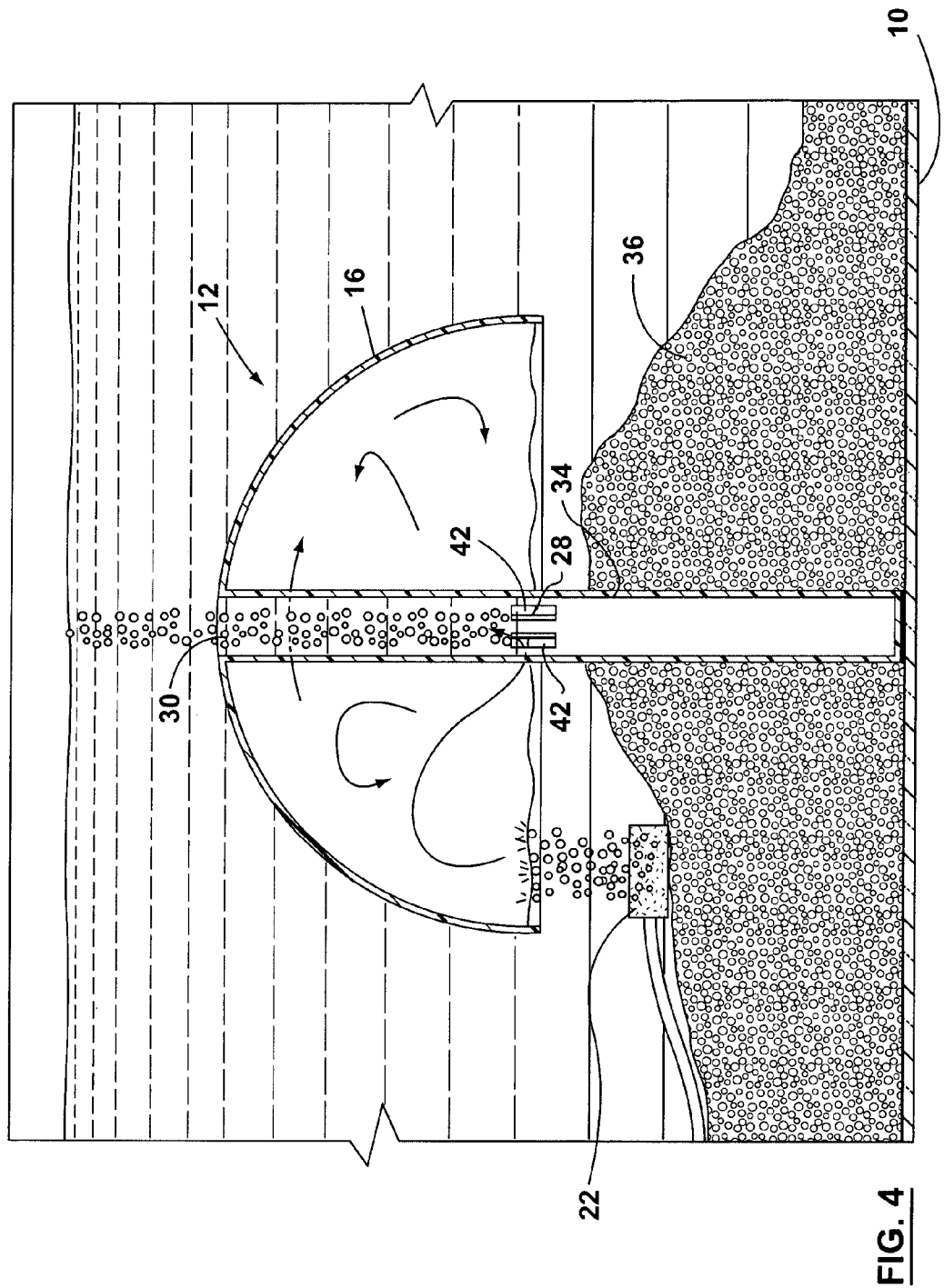

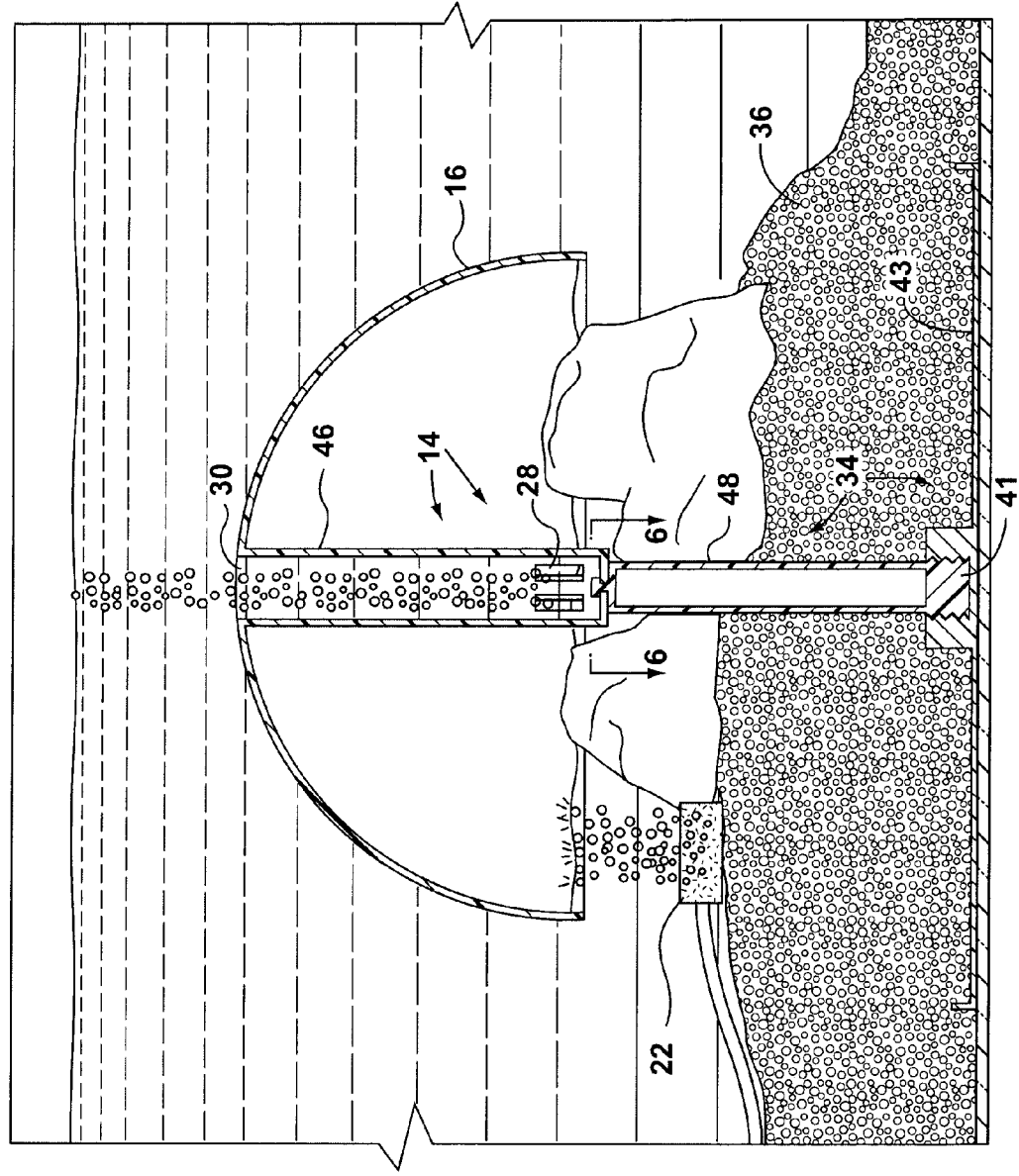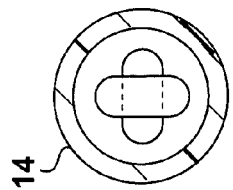

SUBMERGIBLE TERRARIUM

FIELD OF THE INVENTION

This invention relates in general a terrarium submergible in an aquarium. This invention further relates to an aquarium comprising a submergible terrarium.

BACKGROUND OF THE INVENTION

Prior art terrariums adapted to be submerged in an aquarium are known. The purpose of such terrariums is generally to modify the habitat of an aquarium by creating by means of an aeration system a dry zone in the terrarium. The purpose of many terrarium-aquarium arrangements is to provide a submerged aerated dry zone in the aquarium suitable for amphibians.

U.S. Pat. No. 5,313,912 issued to O'Dell on May 24, 1994 discloses an aquarium accessory including a clear dome that is set in place on the habitat floor. The dome has a side opening and at least one top orifice. Air from an aeration system bubbles into the dome through a floor opening, thus creating a dry zone in the dome. Amphibious animals can enter the dry zone and satisfy their need to leave the water periodically, while being confined within the aquarium and remaining fully visible to observers. Air escapes through the top orifice, enabling constant air exchange within the dome. Adjusting airflow from the aeration system varies the volume of the dry zone. The dome includes an outwardly projecting flange that enables the aquarium gravel to anchor the dome within the aquarium. The flange includes perforations sustaining water circulation, as for filtration, within the aquarium.

U.S. Pat. No. 4,958,593 which issued on Sep. 25, 1990 to Hulburt et. al relates to a vivarium comprising at least one terrarium completely submerged in the water in an aquarium. The terrarium and the aquarium shares a common bottom, but are not in fluid communication. The terrarium is accessible through an access opening on the bottom of the terrarium. There can be transparent passageways linking various portions of the terrarium and extending through the aquarium, for travel by animals kept in the terrarium. There can also be transparent passageways linking various portions of the aquarium and extending through the terrarium, for travel by the marine organisms kept in the aquarium.

U.S. Pat. No. 3,939,607 issued on Feb. 24, 1976 to Spector relates to a collapsible terrarium assembly which is inflatable to assume a desired configuration for transparently housing a potted plant or other article to be protectively enclosed. The structure is constituted by a disc-like base and a dome attachable thereto. The dome is formed by an open, flexible plastic envelope whose rim is secured to a coupling ring which is joinable to the base form a hermetically-sealed enclosure, the envelope including a valve for inflating the dome.

U.S. Pat. No. 6,283,061B1 which issued to Dunn on Sep. 4, 2001 relates to a terrarium filtering device, apparatus, and method which includes a base filtration plate, a barrier wall, and an environment separation cup. The present invention includes a terrarium filtering system for maintaining a wet environment, a moist environment, and a dry environment within an aquarium tank. The filtering system includes a terrarium filter plate with a barrier wall to separate the wet and moist areas, water flow holes and water movers connected to a bubbling system to provide aeration and create a water flow, and a passive waste neutralization system. The terrarium filter plate is covered with a filtering media and together they act as a filtering device. Waste material in the water are moved by flowing water to be trapped in the filtering media, and a porous passive neutralization system is used to offset toxins in the water flow.

U.S. Pat. No. 6,176,202B1 which issued on Jan. 23, 2001 to Wood relates to a combination aquarium and terrarium comprising a standard ten-gallon aquarium tank containing water, a physically smaller terrarium and a containment lid. Standard ten-gallon aquarium tanks include a channel shaped band and a channel lip facing the interior of the tank. The terrarium is configured so that, when placed in the tank, the top edges of the terrarium will be positioned between the channel shaped band and the channel lip. A containment lid is provided that mounts on the top side of the channel lip, thereby depressing the terrarium. This downward pressure acts in conjunction with the buoyancy of the terrarium to fix the terrarium in place.

U.S. Pat. No. 6,029,605 issued on Feb. 29, 2000 to Licata and relates to a tank providing multiple environments in upper and lower regions of the tank. A land plate divides the tank into the upper and lower regions and provides a terrestrial environment in which terrestrial and amphibious animals can live.

There is a need for a submergible terrarium and aquarium comprising a submergible terrarium that provides ready access to the dry zone of the terrarium to amphibians. There is a further need for a submergible terrarium that is easy and inexpensive to manufacture, and simple to install and operate.

SUMMARY OF THE INVENTION

An object of one aspect of the present invention is to provide an improved A terrarium adapted to be immersed in an aquarium containing water, the terrarium comprising a shaft means having a first end and second end and a receptacle defining at least one wall, the at least one wall having a length, presenting at least one opening, an air exhaust and an interior wherein the receptacle is connected to the shaft means at the first end wherein the shaft means at the second end is adapted to anchor the receptacle in the aquarium and wherein the interior of the receptacle is adapted to receive air from an air supply means so as to define a dry zone in the interior.

A further object of the present invention is to provide a terrarium adapted to be immersed in an aquarium containing water, the terrarium comprising a hollow shaft having a lower end and an upper end and a receptacle having an interior and defining at least one surface having a lower edge defining at least one opening to said interior and an upper edge connected to said upper end of said hollow shaft, so as to define an air exhaust wherein the interior of said receptacle is adapted to receive air from an air supply means so as to define a dry zone in the interior and wherein said hollow shaft includes an aperture adjacent to said lower end for communicating air from said interior to said air exhaust.

A still further object of the present invention is to provide a method of installing a terrarium in an aquarium containing water, said terrarium presenting a hollow shaft having a lower end and an upper end, said upper end connected to a dome defining an interior and lower edge, comprising the steps of anchoring said lower end of said hollow shaft to said aquarium introducing air from an air supply means to the interior of said dome adjacent to said lower edge, so as to define a dry zone in said dome exhausting said air from said dome through a first aperture adjacent to said lower end of said hollow shaft and out through said upper end of said hollow shaft to said water in said aquarium.

BRIEF DESCRIPTION OF THE DRAWINGS

A detailed description of the preferred embodiment(s) is (are) provided herein below by way of example only and with reference to the following drawings, in which:

FIG. 4 is a sectional view of a third embodiment of the present invention, in which in the shaft is further extended.

FIG. 5 illustrates a fourth embodiment of the present invention, in which the anchor means includes a tray mounted on the shaft.

FIG. 6 illustrates in a sectional view through line 6—6 shown in FIG. 5, a representative attachment of the shaft to the central portion of the reservoir.

Figure 1:
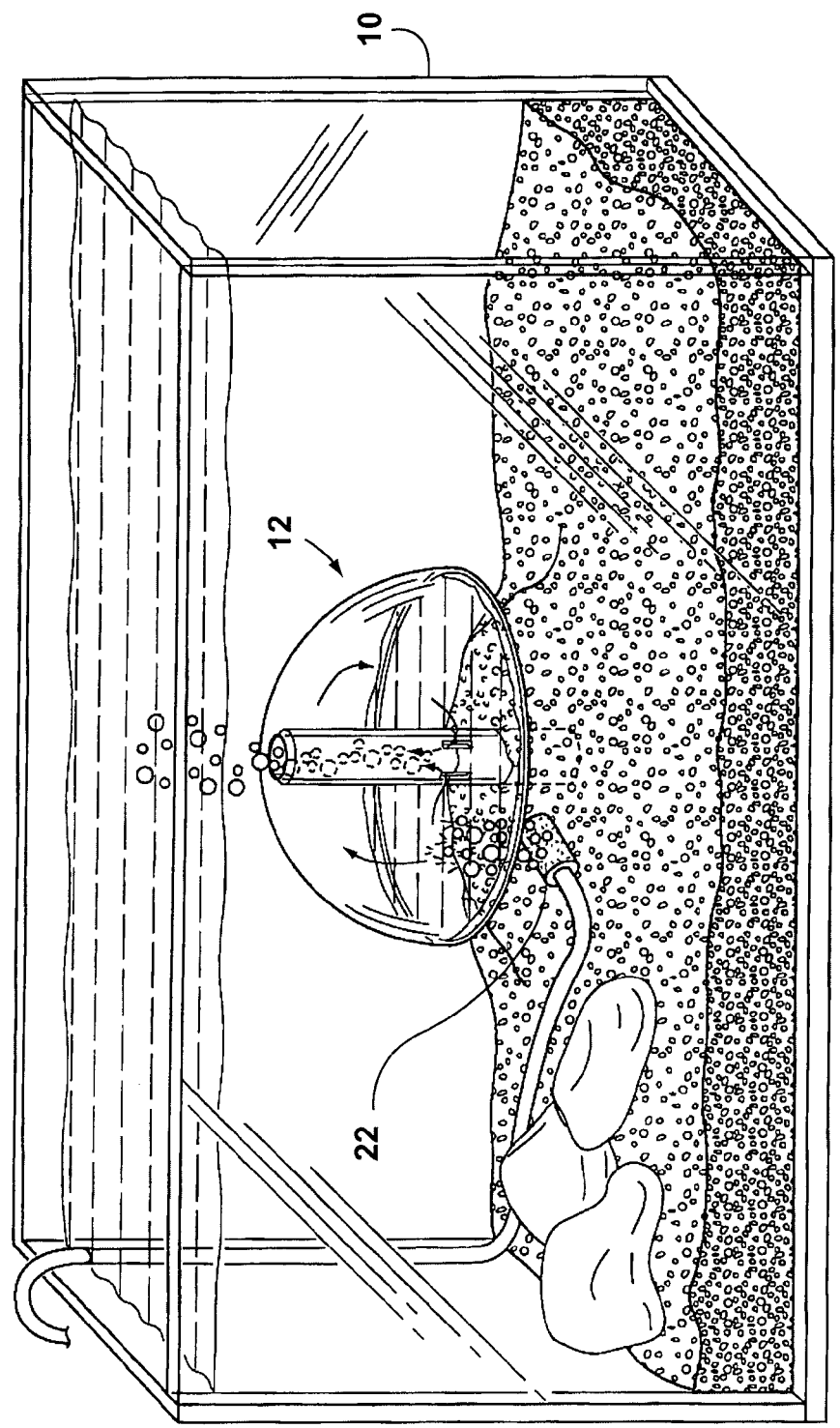
FIG. 1 is a perspective view of a first embodiment of the present invention showing the terrarium of the present invention submerged in an aquarium.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Figure 2:
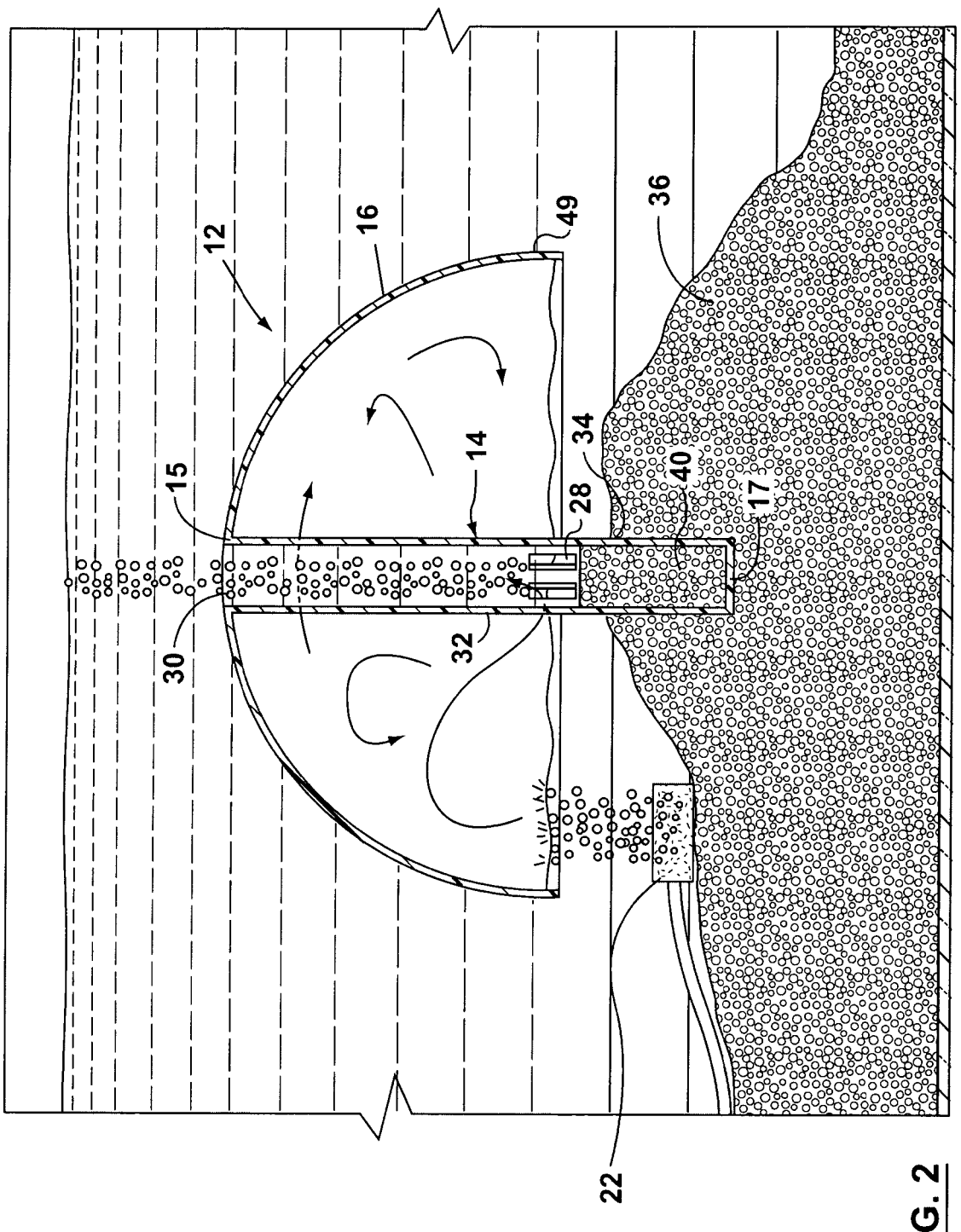
FIG. 2 is a sectional view of the terrarium of the present invention, in the first embodiment thereof, taken at the axis thereof.

Referring to FIG. 1, there is illustrated the terrarium and aquarium comprising a terrarium of the present invention. In an aquarium 10, such as the aquarium of ordinary construction illustrated in FIG. 1, a submergible terrarium 12 is provided. As shown in FIG. 2, the terrarium 12 comprises a shaft means 14 having a first end 15 and second end 17 opposite of the first end.

The terrarium also comprises a receptacle 16, the receptacle defining an interior. As illustrated in FIG. 1, in the first preferred embodiment of the present invention, the receptacle 16 comprises a dome preferably comprising a clear material permitting the interior of the receptacle 16 to be viewed from outside the aquarium. The receptacle 16 is connected to the shaft means 14 at the first end 15, for example by means of a waterproof adhesive.

Figure 3:
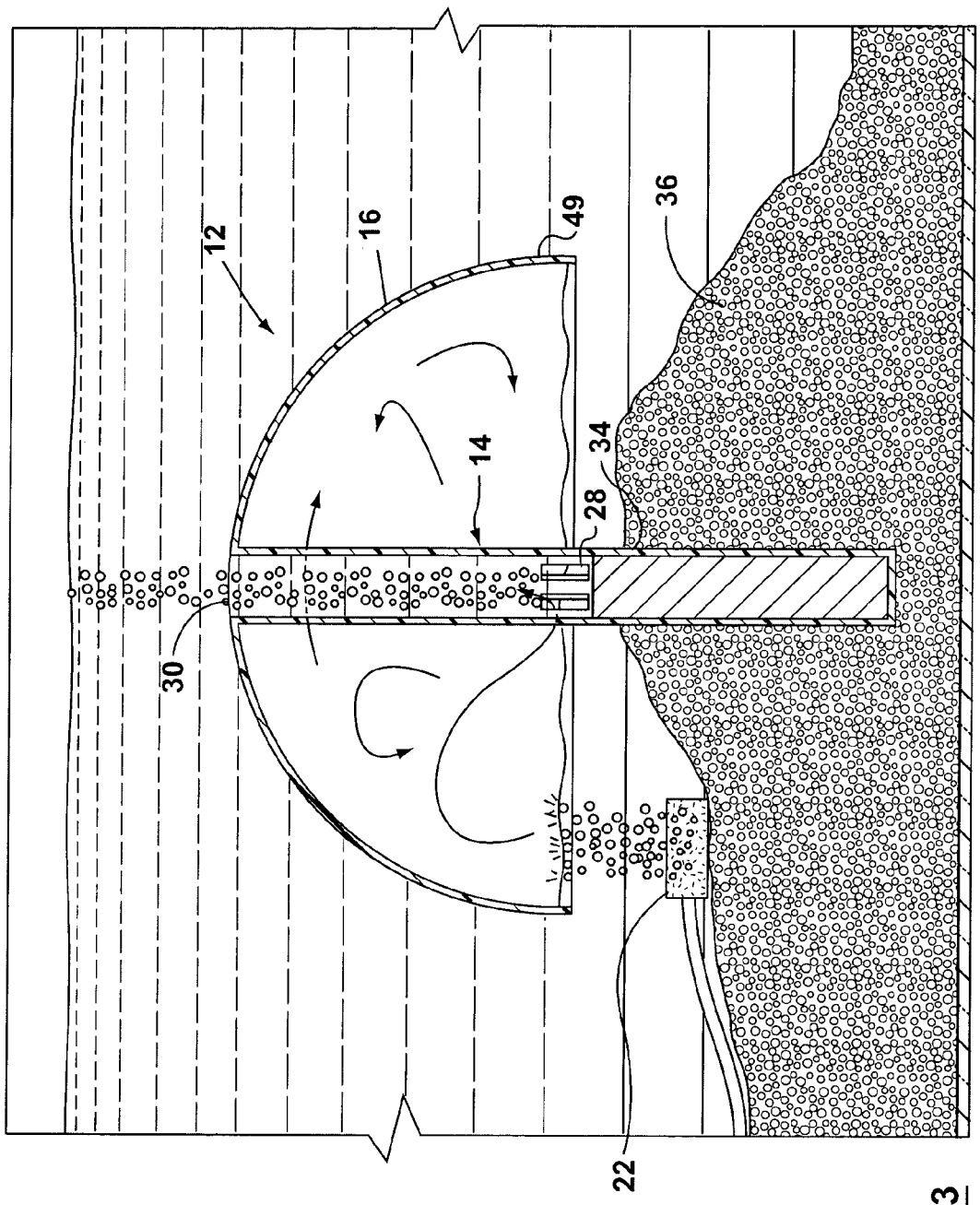
FIG. 3 is a sectional view of a second embodiment of the present invention, having an extended shaft that includes a weight inside the shaft.

The shaft means 14 comprises a wall 32 and an air passageway 26 inside the shaft means 14, as best shown in FIG. 2. The shaft means 14 further comprises an anchor means 34 for anchoring the terrarium 12 inside the aquarium 10. As best shown in FIGS. 2 and 3, the anchor means 34 in the first preferred embodiment of the present invention comprises a weight 40 adjacent to the second end 17 of the shaft means 14. The weight is adapted to anchor the terrarium 12 in the material 36 such as pebbles or sand presented at the base of the aquarium 10. In FIG. 3, the anchor means 34 is relatively elongated so as to be further anchored by the material 36.

Alternatively, as shown in FIG. 4, the anchor means 34 can be further elongated, and may in fact be anchored by the material 36 without a weight disposed inside the anchor means 34.

The present invention contemplates alternate embodiments of the anchor means 34, such as a fastening means (not shown). The embodiment illustrated in FIG. 4 could be attached to the bottom of the aquarium 10, for example using a suitable adhesive. Alternatively, as shown in FIG. 5, the anchor means 34 may include a projecting member that extends axially from the shaft means 14 at the second end 17 so as to anchor the shaft means 14 in material 36. Specifically as illustrated in FIGS. 4, 5, 8, and 9, this projecting member includes a tray 43 type construction that is mounted on the shaft means 14, through some suitable attachment such as the threaded attachment 41 shown in FIGS. 5 and 7. As best illustrated in FIG. 9, the tray 43 includes a side wall 45 that is adapted to retain the materials 36 on the tray 43 thereby anchoring the terrarium 12 of the present invention.

In accordance with the method of installation of the present invention, the terrarium 12 such that it is submerged in the aquarium 10, and such that the anchor means 34 anchors the terrarium 12 within the aquarium 10. An air supply means 22 is provided adjacent to the terrarium 12, as best shown in FIG. 1, such that the air supply means supplies air to the interior of the receptacle 16. The shaft means further comprises an opening, such that the air supply means 22 creates an airflow inside the receptacle 16, as shown in FIGS. 1 and 2.

The referred to airflow enters the interior of the receptacle 16 through the opening as best shown in FIG. 1. The airflow exits the interior of the receptacle 16 through air exhaust, as illustrated for example in FIG. 3. In the embodiment of the reservoir of the terrarium of the present invention illustrated in FIGS. 1–5, the air exhaust is best understood as comprising a first one or more apertures 28 and second one or more apertures 30. The first one or more apertures 28 are presented on the shaft means 14 adjacent to the second end 17. The second one or more apertures 30 are also presented on the shaft means 14, adjacent to the first end 15. Each of said first one or more apertures 28 and second one or more apertures 30 is presented on said wall 32 of the shaft means 14. Each of said first one or more apertures 28 and second one or more apertures 30 communicates with the air passageway 26, such that the airflow (given an optimal setting of the air supply means 22 that is readily achieved by a normal operator using normal settings provided to such an air supply means 22) in the interior of the receptacle 16 tends to circulate in said interior, and then exit through the first one or more apertures 28. The airflow then bubbles through the air passageway 26, out through the one or more second apertures 30, as best shown in FIG. 2.

The first one or more apertures 28 in particular include a plurality of slots 42 best shown in FIG. 4. These slots 42 are preferably presented on the shaft means 14 at position that coincides with the desired boundary of the dry zone in the interior of the receptacle 16.

It should also be understood that in the present invention, opening provides ready access to the interior of the receptacle 16, for example, to amphibians. The opening, as shown in FIG. 2., extends substantially the length of the wall 49 of the receptacle, or in the case of the domed structure of the preferred embodiment, substantially the length of the circumference of the dome. This results overall in a relatively simple structure, and also a structure, that by means of such ready access, amphibians become easily acclimatized to the use of same.

Figure 10:
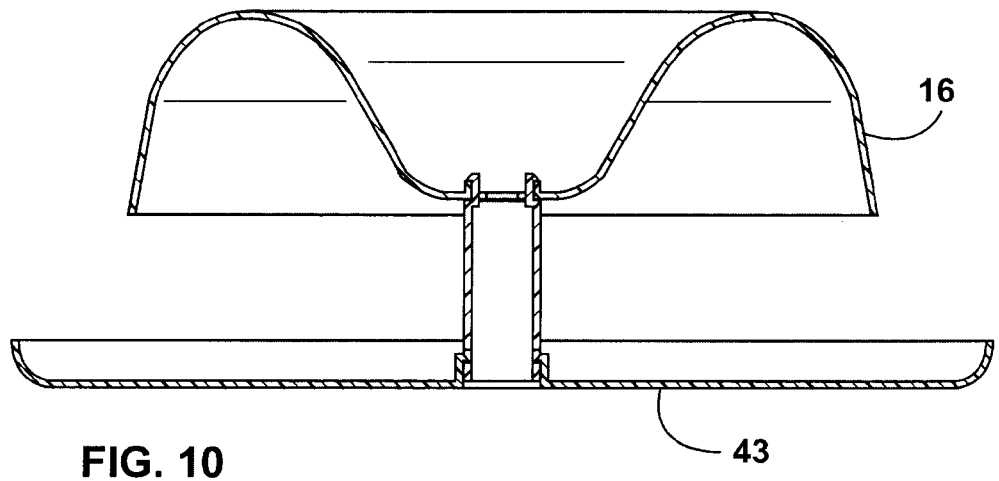
FIG. 10 illustrates in a sectional view a seventh embodiment of the present invention wherein a particular attachment connects the shaft to the tray and the reservoir.
Figure 11:
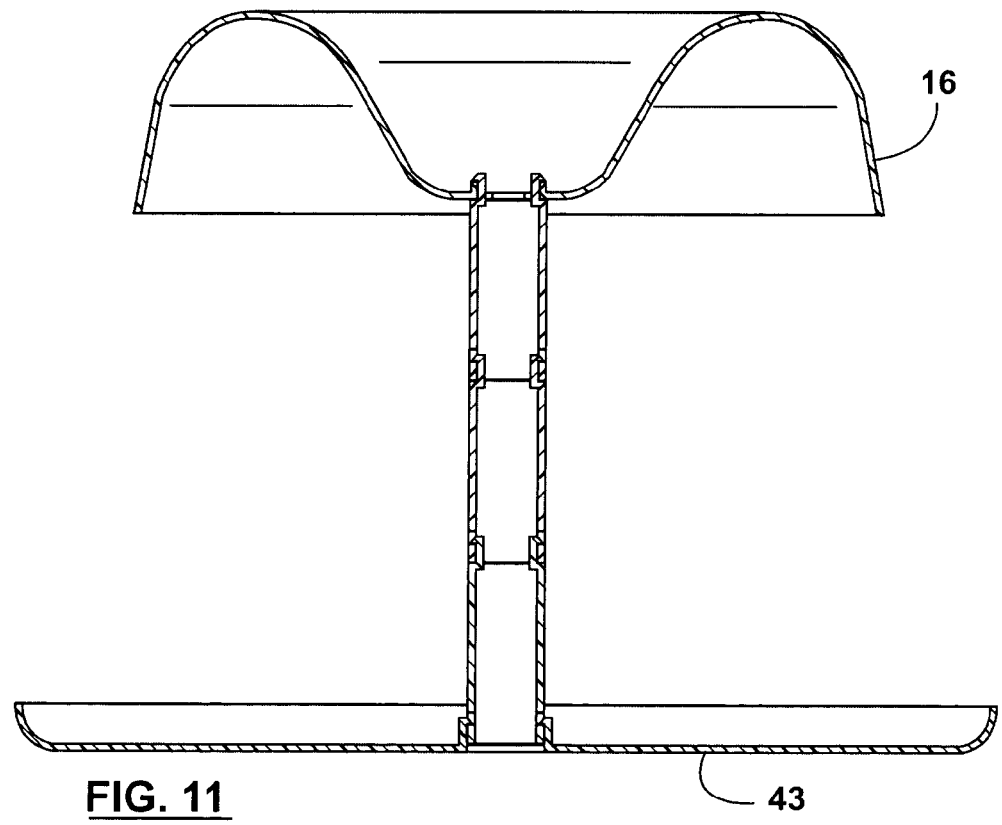
FIG. 11 illustrates in a further sectional view the sixth embodiment of the present invention wherein the sections of the shaft interlock by means of the attachment shown in FIG. 10.

FIGS. 5 and 6 illustrate one particular construction of the present invention, wherein the shaft means 14 includes an upper portion 46 and a lower portion 48 defining that forms part of the anchor means 34. The upper portion 46 and lower portion 48 interconnect by means of the representative connecting structure illustrated in FIGS. 5 and 6. FIGS. 9–11 shown an alternative connecting structure.

Figure 7:
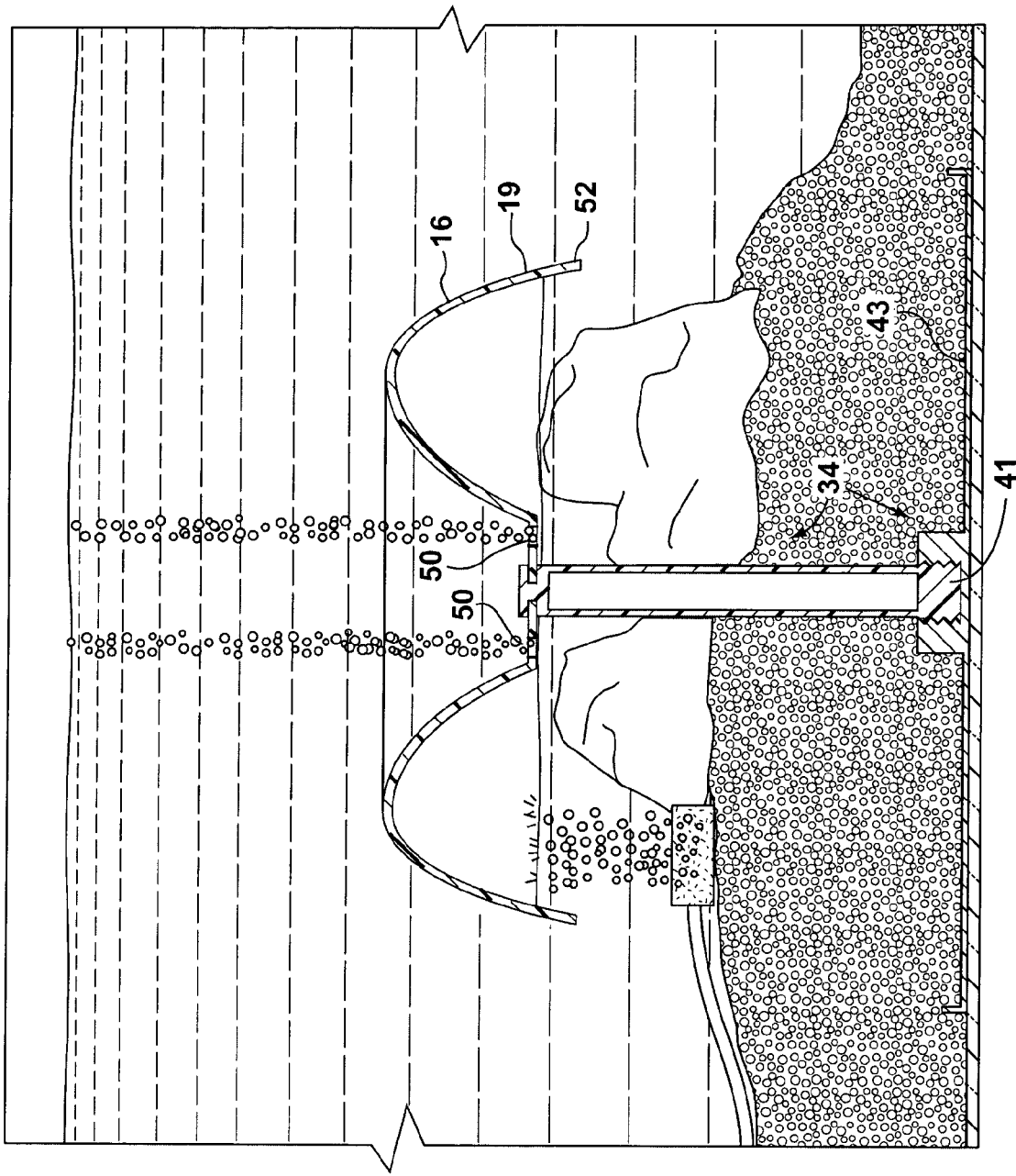
FIG. 7 illustrates a fifth embodiment of the present invention in which the reservoir defines a central hollow area.
Figure 8:
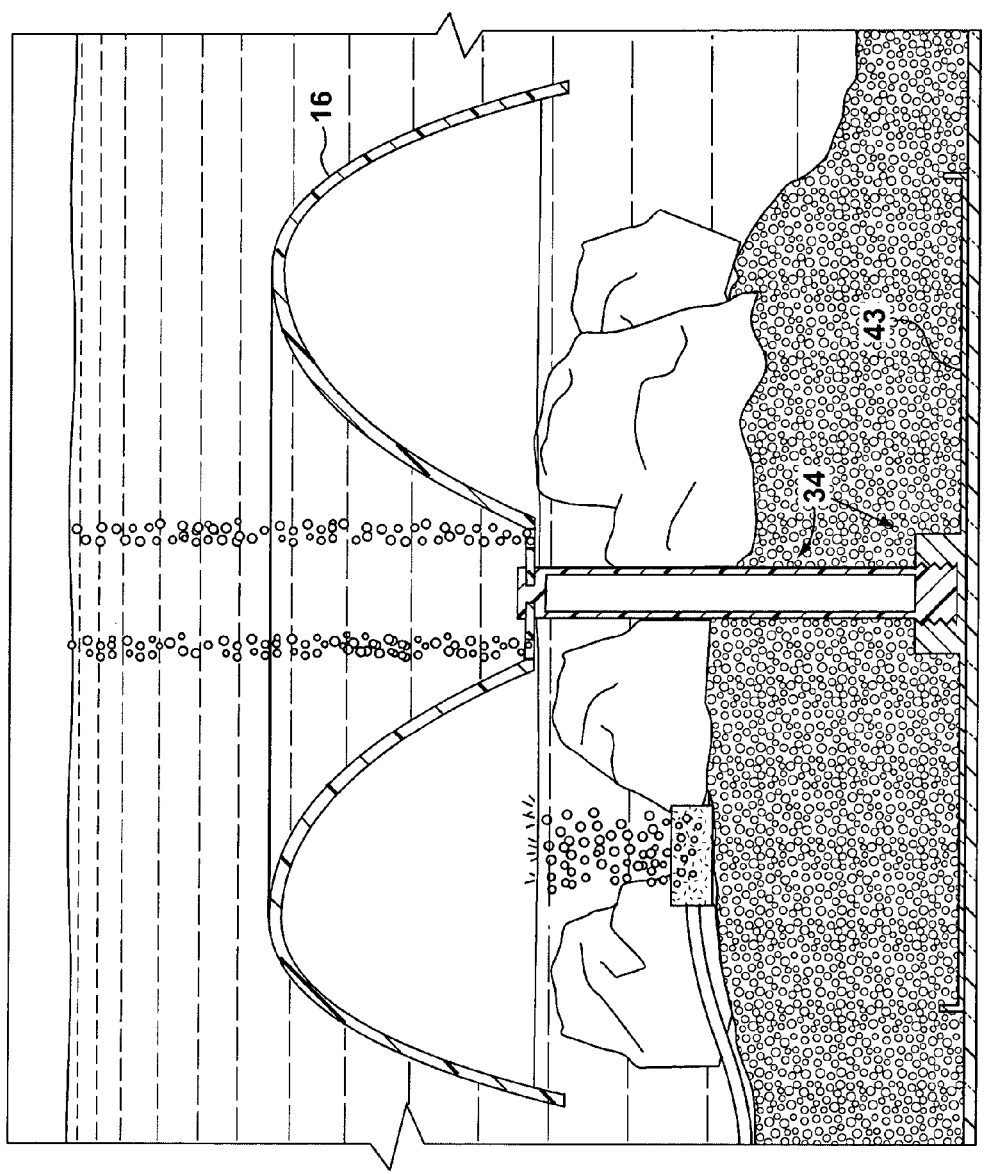
FIG. 8 further illustrates the fifth embodiment of the present invention.
Figure 9:
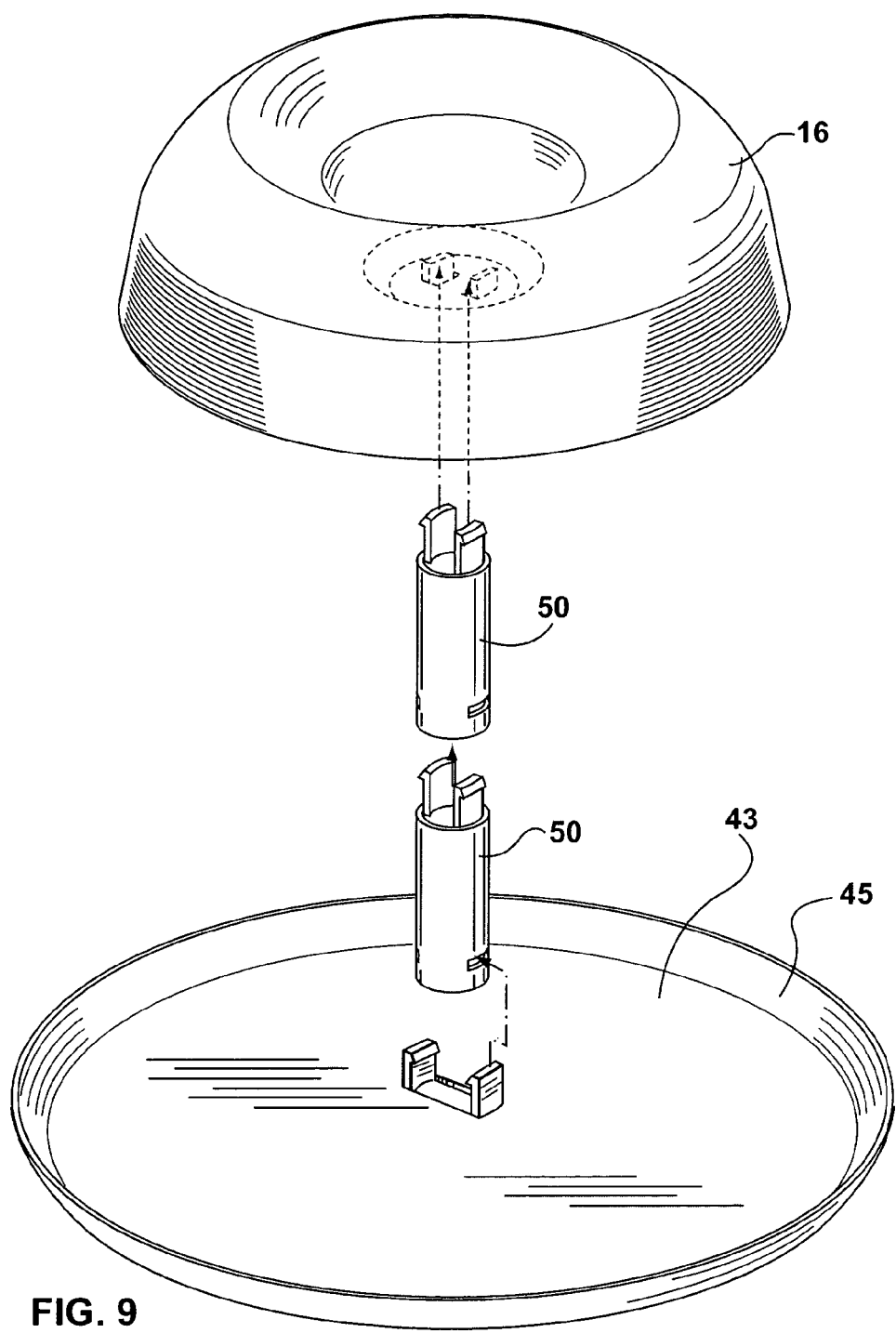
FIG. 9 illustrates in an exploded view a sixth embodiment of the present invention, in which the shaft includes one or more interlocking sections.

FIGS. 7 to 9 illustrate an alternate construction of the present invention wherein the receptacle 16 defines a substantially central hollow portion. In this particular embodiment of the present invention, the air exhaust consists of a single one or more aperture 50, as opposed to the first one or more apertures 28 and second one or more apertures 30 shown in FIG. 2, for example. The air exhaust in this embodiment is preferably disposed above the bottom end 52 of the receptacle wall 49. This is to create the dry zone referred to above, and ensure that the air circulates within the interior of the receptacle 16, and out of the air exhaust.

FIGS. 9 and 11 illustrate a further embodiment of the present invention wherein the lower portion 48 of the shaft means 14 forming part of the anchor means 34 is stackable. Specifically the lower portion 48 includes two or more sections 50 that can be mounted one on top of the other. This increases the height of the terrarium overall. This is suitable as some users may wish to have the terrarium higher or lower within the aquarium 10.

It should be understood that numerous different embodiments described herein can be used in different combinations. For example, the stackable lower portion of the shaft illustrated in FIG. 11 can be used with the receptacle structure shown in FIG. 2.

Other variations and modifications of the invention are possible. For example, it is contemplated by the present invention to introduce in the interior a variety of platforms (not shown) in the interior of the receptacle 16 which are adapted to permit amphibians to breathe air in the interior of the receptacle 16, while being supported in a resting position on such platforms, without the need for swimming in order to breathe air. All such modifications or variations are believed to be within the sphere and scope of the invention as defined by the claims appended hereto.

I claim:

1. A terrarium adapted to be immersed in an aquarium containing water, the terrarium comprising:
   (a) a shaft means having a first end and a second end; and
   (b) a receptacle defining at least one wall, the at least one wall having a length, presenting at least one opening, an air exhaust and an interior;
   wherein the receptacle is connected to the shaft means at the first end the shaft means extends completely through the interior to the exterior of the receptacle; and the shaft means defines an air passageway therethrough;
   wherein the opening is disposed such that the opening permits entry into the interior of the receptacle along substantially the length of the at least one wall;
   wherein the air supply means and the air exhaust are operable to create an airflow in the interior of the receptacle, and wherein the airflow exists the receptacle by means of the air exhaust;
   wherein the shaft means at the second end is adapted to anchor the receptacle in the aquarium; and
   wherein the interior of the receptacle is adapted to receive air from an air supply means so as to define a dry zone in the interior.

2. A terrarium as claimed in claim 1, wherein the air exhaust is defined by:
   (a) at least one first aperture provided by the shaft means adjacent to the opening of the receptacle, the first aperture communicating with the air passageway;
   (b) at least one second aperture provided by the shaft means adjacent to the first end of the shaft, the second aperture communicating with the air passageway and the aquarium;
   wherein the airflow passes from the interior of the receptacle through the first aperture and through the air passageway out of the second aperture.

3. A terrarium as claimed in claim 2, wherein the shaft means comprises a wall, and said at least one first aperture comprises a plurality of slots disposed on the wall of the shaft means adjacent to the opening.

4. A terrarium as claimed in claim 3, further comprising an anchor means at the second end of the shaft means.

5. A terrarium as claimed in claim 4, wherein said anchor means comprises at least one projecting member adjacent to the second end of the shaft means, the projecting member projecting from the axis of the shaft means and being operable to anchor the terrarium in a material provided at the base of the aquarium.

6. A terrarium as claimed in claim 5, wherein the material comprises pebbles or sand, or pebbles and sand.

7. A terrarium as claimed in claim 1, wherein the shaft means adjacent to the second end includes a plurality of interconnecting sections.

8. A terrarium as claimed in claim 7, wherein the interconnecting sections are stackable thereby permitting the height of the terrarium to be varied by adding or removing one or more of the interconnecting sections.

9. A terrarium as claimed in claim 1, wherein the receptacle further defines a hollow section disposed substantially centrally.

10. A terrarium as claimed in claim 9, wherein the air exhaust is disposed in the hollow section, above the bottom of the at least one wall having a length, thus defining the dry zone.

11. A terrarium adapted to be immersed in an aquarium containing water, the terrarium comprising:
   (a) a hollow shaft having a lower end and an upper end; and
   (b) a receptacle having an interior and defining at least one surface having:
      (i) a lower edge defining at least one opening to said interior; and
      (ii) an upper edge connected to said upper end of said hollow shaft, so as to define an air exhaust;
   wherein the interior of said receptacle is operable to receive air from an air supply means so as to define a dry zone in the interior; and wherein said hollow shaft includes an aperture adjacent to said lower end for communicating air from said interior to said air exhaust.

12. A method of installing a terrarium in an aquarium containing water, said terrarium presenting a hollow shaft having a lower end and an upper end, said upper end connected to a dome defining an interior and lower edge, comprising the steps of:

(a) anchoring said lower end of said hollow shaft to said aquarium;

(b) introducing air from an air supply means to the interior of said dome adjacent to said lower edge, so as to define a dry zone in said dome; and (c) exhausting said air from said dome through a first aperture adjacent to said lower end of said hollow shaft and out through said upper end of said hollow shaft to said water in said aquarium.

* * * * *